July 2, 1968
S. L. GILLESPIE
3,390,594
CONVERTER CLUTCH WITH GOVERNOR AND
TRANSMISSION SELECTOR CONTROL
Filed June 15, 1966
3 Sheets-Sheet 1
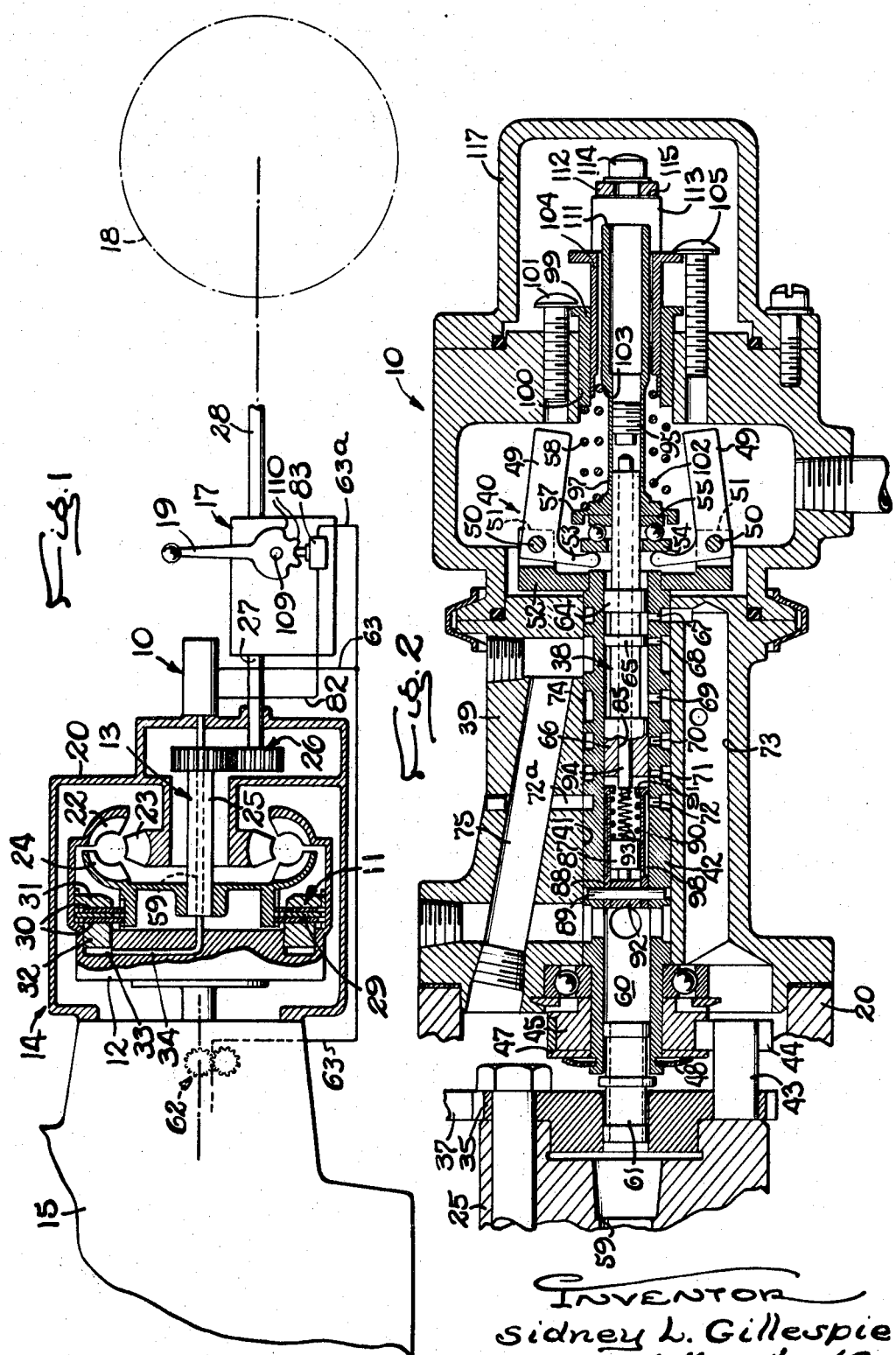
INVENTOR
Sidney L. Gillespie
by Wolfe, Hubbard, Voit & Osann
ATTORNEY

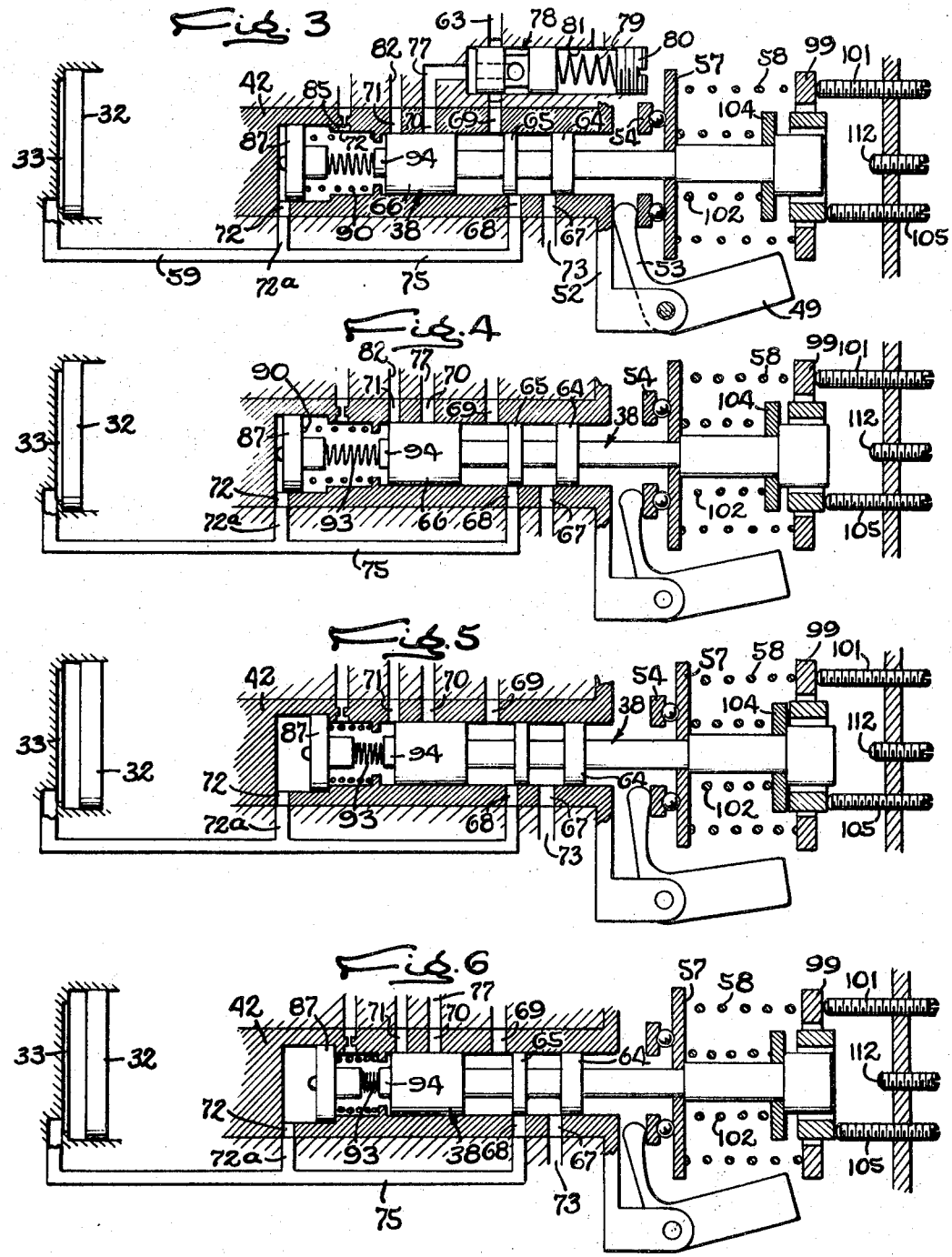

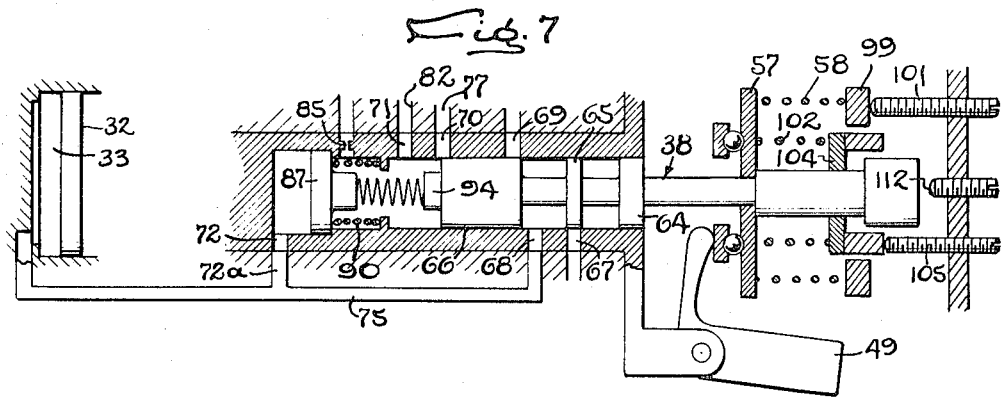
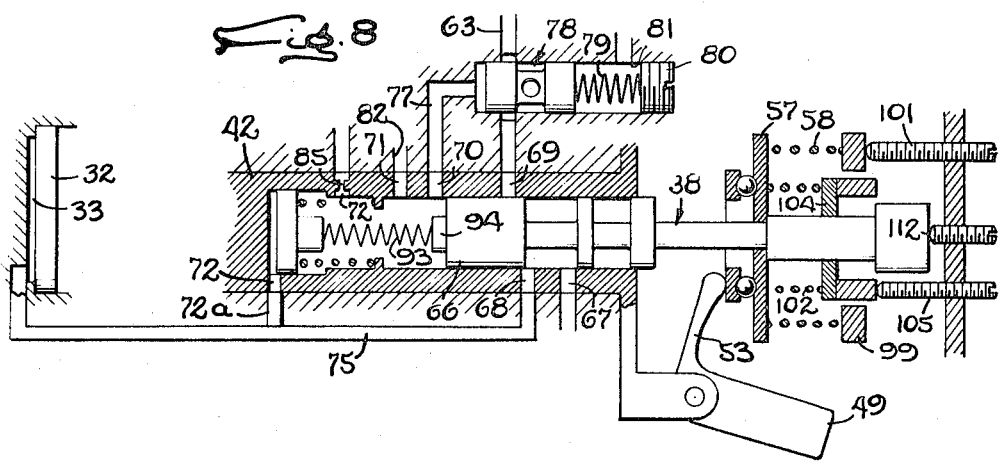
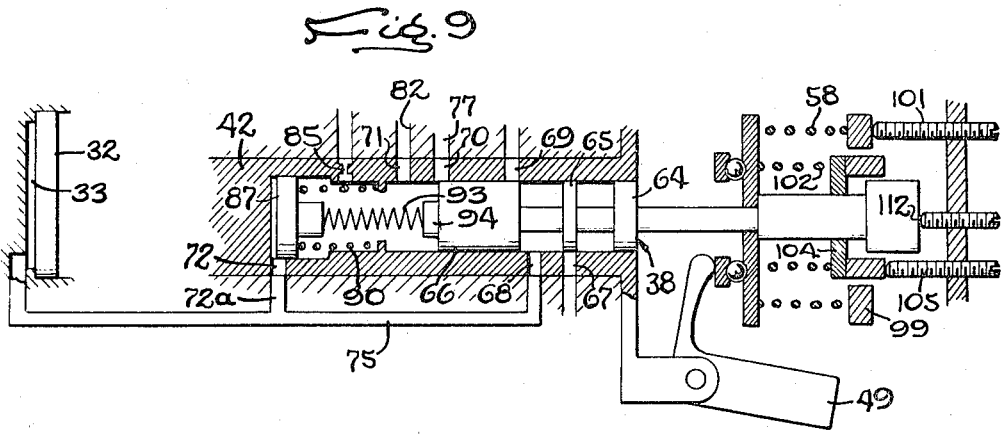

United States Patent Office 3,390,594
Patented July 2, 1968

3,390,594
CONVERTER CLUTCH WITH GOVERNOR AND TRANSMISSION SELECTOR CONTROL
Sidney L. Gillespie, Rockford, Ill., assignor to Woodward Governor Company, Rockford, Ill., a corporation of Illinois
Filed June 15, 1966, Ser. No. 557,657
23 Claims. (Cl. 74—732)

ABSTRACT OF THE DISCLOSURE

A speed-responsive actuator for a disk clutch operable when engaged to lock up a torque converter and when disengaged to unlock the converter, the actuator having a flyweight speed sensor driven by the output shaft and acting against a speeder spring to move a valve plunger within a housing from a start position through a succession of positions along a predetermined path, and then back to the start position. A plurality of heads on the plunger cooperate with ports along the path to apply and release clutch-actuating pressure according to a preselected program as the plunger moves along its path, maintaining the converter unlocked at speeds below a first level, locking the converter as the speed increases through a second level, maintaining it locked up while the speed remains between the first level and a third level above the second level, unlocking the converter above the third level, and locking up as the speed decreases from the third level to a lower fourth level. An overriding control responsive to initiation of a transmission shift also is provided to move the control plunger and unlock the converter during the shift.

---

This invention relates to an actuator for engaging and disengaging a clutch that is operable when engaged to lock up the rotary input and output elements of a hydraulic torque converter for a positive mechanical drive. Such a drive is more efficient than the normal fluid drive obtained with the converter when the output speed is at a relatively high level, and thus is desirable under some operating conditions. The clutch is disengaged for normal converter operation outside the selected lock-up range and also during transmission ratio changes which produce substantial shock loads that can damage the engine or the transmission if the converter is locked up.

The primary object of the present invention is to provide a novel actuator for measuring the changing speed of the output element of the converter during operation of the driven machine and automatically engaging and disengaging the clutch to lock up and unlock the converter in response to sensed changes in the output speed, and also disengaging the clutch automatically in response to the initiation of a transmission shift, thereby avoiding the need for attention by the operator and eliminating the possibility of operator error in the control of the lock-up clutch.

Another object is to engage the clutch automatically in response to attainment of a preselected level for lock up of the converter and to maintain the clutch engaged only as long as the speed remains within a preselected range.

A further object is to disengage the clutch and restore converter operation automatically in response to an increase in the measured speed above the selected lock-up range, and also in response to the initiation of a transmission shift, regardless of the prevailing speed at the time of the shift.

Still another object is to accomplish the foregoing with a controller of relatively simple and inexpensive construction.

A more detailed object is to actuate the clutch hydraulically with a control valve having a member movable through a succession of positions and causing engagement and disengagement of the clutch according to the position of the member along its path, and to position the member with a speed sensor continuously measuring the output speed and displacing the valve member from its start position in accordance with the prevailing output speed.

Another object is to override the speed sensor in response to attainment of a selected level for clutch actuation, and to shift the valve member rapidly to a position in which the clutch-actuating valve is wide open in order to obtain snap-engagement of the clutch.

Another object is to reset the speed sensor automatically at the different levels selected for clutch actuation thereby to eliminate hunting under transient conditions.

Other objects and advantages of the invention will become apparent from the following detailed description taken in connection with the accompanying drawings, in which FIGURE 1 is a schematic side elevational view, partly broken away and shown in section, of a representative torque converter drive equipped with an actuator embodying the novel features of the present invention.

FIG. 2 is an enlarged fragmentary cross-sectional view taken in a longitudinal plane extending along the axis of the actuator in FIG. 1.

FIG. 3 is a fragmentary cross-sectional view schematically illustrating the condition of the actuator when the output element is stationary.

FIGS. 4–9 are schematic views similar to FIG. 3 showing different conditions of the actuator under different output conditions.

As shown in the drawings for purposes of illustration, the invention is embodied in an actuator 10 for applying and releasing a clutch 11 (FIG. 1) acting between the rotary input and output elements 12 and 13 of a hydraulic torque converter 14 for coupling a prime mover 15 to a driven mechanism such as a multi-ratio transmission 17 for driving the wheels 18 of a vehicle as shown schematically in FIG. 1. A typical application of this arrangement is in heavy earthmoving equipment such as a scraper.

In such machines, the engine 15 is run at a relatively high speed for optimum operating efficiency, and operating speed changes of the vehicle are accomplished by changing the transmission ratio with a suitable control such as the selector lever 19 shown in FIG. 1. The torque converter 14 is of well-known construction and operation and thus is shown only schematically in FIG. 1, wherein it will be seen that the converter is enclosed in a housing 20 secured to the engine with the input element 12 connected to the engine shaft 21 for rotation therewith. Herein, the input element is generally cup-shaped and carries the blades 22 for pumping fluid through the blades 24 of the output element 13 to rotate the latter, and then through the stator elements 23 which redirect the flow, the output element being nested within the cup-shaped housing and keyed to the left end portion of the output shaft 25. This shaft is geared at 26 to the parallel input shaft 27 of the transmission 17, which is coupled to the wheels by a shaft 28.

The clutch 11 is a conventional disk clutch shown with a disk 29 on the input element sandwiched between two disks 30 on the output element, the three disks being disposed between a backing ring 31 carried on the input element and a ring-shaped piston 32 guided for axial movement toward and away from the backing ring in an annular chamber 33 formed in the input element. When pressure fluid is admitted into the chamber through an inlet conduit 34, the piston is forced to the right to clamp the three disks together and against the backing ring thereby engaging the clutch and locking the converter elements together. This provides a positive, straight-through drive that transmits torque to the transmission with no slippage loss. When the pressure in the chamber is relieved, the disks are allowed to separate and unlock the converter elements for rotation relative to each other so that the converter multiplies the engine torque for increased output torque while producing a smooth fluid drive capable of cushioning torsional shock loads such as those occasioned by changing of the transmission ratio.

For optimum performance, the converter 14 is unlocked while the driven machine is operating in the lower output speed ranges and is locked up only when the output speed attains a relatively high level, as indicated by a tachometer (not shown) which may be driven by a gear 35 (FIG. 2) fast on the output shaft 25 and meshing with a similar gear 37 shown in part in FIG. 2. While operating at high speeds, the converter may be kept in the locked-up condition for maximum efficiency without danger of damage to the equipment through shock loads, and is unlocked only if the output speed drops substantially or increases toward a dangerous overspeed condition such as may occur when a heavily loaded scraper is on a downgrade and begins to accelerate to an excessive speed. To assist in braking under such conditions, the converter is unlocked so that the wheels 18 drive the engine through the converter, which is highly inefficient in reverse operation. This dissipates a major portion of the driving force and brakes the machine. Any transmission shift produces a substantial shock load between the engine and the transmission, so the converter should be unlocked prior to all such shifts. Following each shift, the converter can be locked whenever the output speed reaches the level selected for lock up.

From the foregoing, it should be evident that proper operation of the lock-up clutch 11 requires careful attention to the output speed of the converter. Moreover, failure to unlock the converter prior to a transmission shift, or when the speed of the machine is dropping into the lower speed range, or when the machine is approaching a dangerous overspeed condition, can result in damage to the engine 15 or the transmission 17.

In accordance with the present invention, the actuator 10 continuously senses the output speed of the torque converter 14 after the engine 15 is started, and automatically actuates the clutch 11 in response to speed changes to maintain the converter unlocked at speeds below the selected range for locked-up operation, to lock up the converter as the speed increases into this range, to unlock the converter as the speed increases above a second level selected as the upper limit of the range, to lock up the converter after the speed has dropped back to a safe level, and to unlock the converter whenever the speed drops below the selected lower limit of the lock-up range thereby to restore the fluid drive. Moreover, the actuator automatically and immediately unlocks the converter in response to initiation of a transmission shift with the selector 19, and engages the clutch after the shift is completed if the output speed is within the selected range.

To achieve the foregoing, the actuator comprises a plunger 38 forming a valve spool that is guided in a housing 39 for movement along a predetermined path from a start position (FIG. 3) through a succession of spaced intermediate positions and back to the start position, and is moved by a speed sensor 40 continuously measuring the speed of the output element 13 and positioning the plunger along its path in accordance with the output speed. Means on the plunger and in the housing apply and release pressure in the clutch chamber 33 according to a preselected program as the plunger moves back and forth along its path thereby to engage and disengage the clutch under the appropriate operating conditions as indicated by the speed sensor. Accordingly, the operator's attention may be concentrated on other aspects of the machine, and the possibility of damage due to an error or an oversight in the operation of the lock-up clutch is eliminated.

In this instance, the housing 39 of the clutch actuator 10 is mounted on the converter housing 20 at the end of the output shaft 25 (see FIGS. 1 and 2) and is formed with a central bore 41 rotatably supporting a ported sleeve 42 coaxial with the output shaft. The sleeve is rotated with the shaft by a yieldable connection formed by a pin 43 fast on the gear 35 and projecting away from the gear parallel to the axis of the shaft. The free end portion of the pin engages the radially projecting end portion of a spring 44 wrapped around and anchored to a collar 45 on the adjacent end of the sleeve, and thus turns the sleeve at the same speed as the output shaft. A washer 47 and a bowed "E" ring 48 hold the spring in place.

The speed sensor 40 includes a pair of flyweights 49 pivoted at 50 on lugs 51 projecting axially from one side of a head in the form of a disk 52 fast on the right end (FIG. 2) of the rotary sleeve. The inwardly extending arms 53 of the flyweights press against a disk 54 forming the left race (FIG. 2) of an anti-friction thrust bearing, the other race of the bearing being formed by a pair of disks 55 and 57 fast on the end of the plunger. The latter is telescoped into the sleeve 42 with a close sliding fit and thus is guided by the sleeve for back and forth movement in the housing. The speed sensor also includes a coiled compression spring 58 acting against the disk 57 to oppose movement of the plunger to the right in FIG. 2. Thus, during rotation of the output shaft 25, the sleeve 42 and the flyweights 49 are rotated at the same speed and the centrifugal force acting on the flyweights swings the latter outwardly to exert a corresponding axial force on the plunger. When this axial force balances against the opposing force of the so-called speeder spring, the plunger assumes a position within the sleeve that is a measure or indication of the output speed.

To engage the clutch 11, pressure fluid is delivered to the clutch chamber 33 through a longitudinal passage 59 formed in the output shaft 25 and communicatin at one end with the inlet conduit 34 leading to the clutch chamber through the input element. The passage 59 communicates at its other end with a chamber 60 in the left end portion of the sleeve 42 through a hollow fitting 61 extending between the end of the sleeve and the center hole of the gear 35, the center hole being alined with the enlarged end of the delivery passage 59. Herein, the source of pressure fluid is a pump 62 (FIG. 1) driven by the engine 15 and having an output line 63 leading to the actuator 10 and adapted to be connected by the latter to the delivery passage 59 in the output shaft. A suitable pump output pressure that may be used is 180 p.s.i.

The means on the plunger 38 and in the housing 39 for controlling the application and release of actuating pressure in the clutch chamber 33 comprise a plurality of heads or lands 64, 65 and 66 on the plunger cooperating with a series of ports 67–72 spaced along the rotary sleeve 42 to establish communication between the outlet chamber 60 of the actuator and either a drain passage 73 or a pressure supply passage 74, depending upon the position of the plunger. It will be seen in FIG. 2 that each of the ports in the sleeve 42 is formed by one or more openings through the inner wall of the sleeve leading into a groove encircling the outside of the sleeve. The grooves communicate continuously with the associated pasages in the actuator housing 39 to carry fluid to and from the housing passages through the connecting passages defined between the plunger lands.

As shown most clearly in FIGS. 3–9, the drain port 67 is formed adjacent the right end of the sleeve 42 and communicates with the drain passage 73 which is formed in the housing alongside the bore 41 and communicates with a suitable sump (not shown). Spaced along the sleeve to the left from the drain port is the clutch port 68 which communicates with a clutch passage 75 leading to the chamber 60 at the left end of the bore. The next port to the left along the sleeve is the supply part 69 which opens through the sleeve into the supply passage 74 communicating with the pump output line 63 (FIG. 1) and thus continuously receives pressure fluid at 180 p.s.i. when the pump is operating. Beyond the supply port, the port 70 (hereafter referred to as the overspeed port) also communicates with the pump output line 63 through a passage 77 (FIGS. 3-9) and a pressure-control valve 78 (FIGS. 3 and 8) built into the actuator housing 39 and herein maintaining pressure in the line 77 on the order of 40 p.s.i. This valve is of a well-known type having a spring 79 which sets the pressure level maintained in the passage 77 and thus at the overspeed port. A screw 80 threaded into the right end of the valve bore 81 adjusts the force of the spring and thus permits adjustment of the pressure level of the fluid delivered through the valve.

The next port 71 to the left from the overspeed port 70 communicates with a passage 82 (FIGS. 3-9) which receives pressure fluid from the pump output line 63 through branch line 63ᵃ and a valve 83 (FIG. 1) whenever a transmission ratio change is initiated by movement of the selector lever 19.

To open the clutch port 68 wide for snap-engagement of the clutch 11 as soon as the plunger 38 begins to open the port, a pilot piston 87 is guided in the left end of the sleeve 42 and adapted to be pressed against the left end of the plunger in response to the initial opening of the clutch port thereby to shift the plunger immediately to the right beyond the position shown in FIG. 4 to the position in FIG. 5, in effect overriding the speed sensor 40. Herein, the pilot piston is guided in a bushing 88 pinned at 89 to the left end of the sleeve, and normally is held in a retracted position (FIGS. 2 and 3) by a coiled spring 90 compressed between the piston and an inturned flange 91 encircling the right end of the bushing. In the retracted position, a stud on one side of the piston is held against a plug 92 fast in the left end of the bushing. Projecting toward the plunger from the other side of the piston is a coiled compression spring 93 engageable with the adjacent end of a rod 94 loosely extending through a center bore 85 through the plunger, the opposite end of the rod projecting beyond the right end of the plunger as shown in FIG. 2 for engagement with a plug 95 threaded into a hollow coaxial stem 97 fast on the right end of the plunger.

Opening into the interior of the bushing 88 between the plug 92 and the pilot piston 87 is a passage 98 in the bushing (FIGS. 2-9) communicating with the port 72 and a conduit 72ᵃ leading to the clutch passage 75 and thus pressurized with the clutch passage as soon as the clutch port 68 is cracked open to receive pressure fluid from the supply port 69. Accordingly, when the output speed attains the selected lock-up level, the pilot piston is shifted to the right against the rod 94 and, through the plug 95, to a new position in which the flyweight force and the added spring force balance against the force of the speeder spring 58. In this instance, the extended position of the pilot piston is determined by its return spring 90 which becomes coil-bound between the piston and the flange 91 to stop movement of the piston to the right. It will be seen that the force exerted on the plunger in the extended position of the pilot piston may be varied by adjusting the position of the plug 95 within the stem.

As will be seen in FIG. 2, the speeder spring 58 of the speed sensor 40 abuts at one end against the outer peripheral portion of the disk 57 around a central boss on the disk for holding the spring coaxial with the bearing. At its opposite end, the spring engages the annular end surface of a sleeve 99 that is telescoped slidably into a bore 100 formed in the end of the housing coaxial with the bore 41. A screw 101 is threaded into the end of the housing with its head overhanging and abutting against a flange on the outer end of the sleeve so that the position of the sleeve axially of the housing may be adjusted to vary the initial compression of the spring and thereby adjust the positions of the plunger under different speed conditions.

The resistance to movement of the plunger 38 at speeds above the selected lock-up level preferably is increased by a second spring 102 (see FIGS. 2-9) which is disposed within the first spring 58 and compressed between the disk 57 and a shoulder 103 formed by the enlarged end of the stem 97 (FIG. 2) of the plunger. The stem projects to the right through the springs and through a second adjustable sleeve 104 telescoped slidably into the sleeve 99. Initially, the right end of the inner spring is disposed loosely within a counterbore in the adjacent end of the inner sleeve and is held against the shoulder 103. As the plunger moves to the right, the inner spring is carried idly to the right between the bearing disk and the shoulder, the spacing of the two remaining constant. After the right end of the inner spring reaches the end of the counterbore, however, the force of this spring is added to the force of the outer spring and becomes effective to resist movement of the plunger 38 by the flyweights 49. This occurs after the converter 14 has been locked up and as the speed increases to a level somewhat above the selected lock-up level.

The position of the inner sleeve 104 also is adjustable to vary the position of the plunger 38 at which the inner spring becomes active. This is accomplished with an adjusting screw 105 having a head overhanging and abutting against an external flange on the end of the inner sleeve to position the latter axially of the housing for engagement with the end of the inner spring in different positions of the plunger. With this arrangement, the speed sensor 40 produces a relatively small amount of movement of the plunger as a result of a speed increase from the selected lock-up level to the overspeed level selected for unlocking, as will be seen by comparing FIGS. 5 and 7.

Extending across the path of the right end 111 of the stem 97 is a bar 112 supported on spaced posts 113 on the end of the housing 39, the bar being fastened to the posts by screws 114. The bar limits the stroke of the plunger, and may be set for a precise stroke length by use of shims at 115. A cover 117 is fastened to the end of the housing.

*Operation*

When the engine 15 is stopped or uncoupled from the converter 14, the output shaft 25 and the ported sleeve 42 are stationary and the flyweights 49 of the speed sensor 40 are swung inwardly by the spring 58 which thus holds the plunger 38 in the start position shown in FIG. 3 with the clutch port 68 communicating with the drain port 67 through the space between the lands 64 and 65, and with the supply port 69 opening into the closed space between the lands 65 and 66. Because the clutch passage 75, the passage 59 and the chamber 33 are vented through the drain line 73, the clutch 11 is disengaged to unlock the converter. Both the overspeed port 70 and the shift port 71 are closed by the land 66.

As the engine 15 begins to turn the converter input element 12, the output element 13 is driven through the converter to turn the shaft 25 and the ported sleeve 42 carrying the flyweights 49 which thus swing outwardly and exert an axial force on the bearing disk 54 that varies with the speed of rotation of the output shaft. Thus, the flyweights shift the bearing and the plunger 38 to the right until the flyweight force balances against the force of the spring 58. By proper adjustment of the screw 101 and the position of the stop sleeve 99, the force exerted by the spring is adjusted to prevent movement of the plunger to the position shown in FIG. 4 until the output speed attains the level selected for locking up of the converter, for example, a speed of 1700 r.p.m.

At this level, the land 65 cracks open a passage into the clutch port 68 to leak pressurized fluid into the passage 75. This immediately begins to pressurize the chamber behind the pilot piston which responds almost immediately to shift to the right and apply a motive force to the plunger 38 through the spring 93. Thus, the pilot piston adds its spring force to that of the flyweights 49 to shift the plunger far enough to the right to open the clutch port a substantial amount. Accordingly, fluid is delivered at a rapid rate to the clutch chamber 33 to engage the clutch 11 with a snap action. The combined pilot force and flyweight force then balance against the spring 58 in the new position shown in FIG. 5 with the clutch engaged and the torque converter 14 locked up for a positive, straight-through drive.

It will be seen that the pilot force of the spring 93 remains effective to oppose the speeder spring 58 while the clutch port 68 is open, and thus effectively resets the speed sensor 40 for closing of the clutch port to disengage the clutch at a substantially lower speed level than the level selected for clutch engagement, as shown in FIG. 6. As a result, the pilot piston not only produces snap-engagement of the clutch but also eliminates hunting by the control if the output speed should hover or vary up and down near the actuating level. For example, the reset level may be on the order of 1400 r.p.m., as determined by the adjustment of the plug 95 in the stem 97.

As long as the output speed remains above 1400 r.p.m. and below the upper limit selected for locked-up operation, the clutch port 68 remains open to the supply port 69 to maintain the engagement of the clutch 11. If the output speed drops below 1400 r.p.m., the speed sensor 40 moves the plunger 38 back to the left as shown in FIG. 6 until the land 65 closes the clutch port and vents the clutch passage 75 through the drain line 73. This disengages the clutch to restore converter operation and simultaneously releases the pilot piston 87 to the action of its return spring 90 to reset the speed sensor for engagement of the clutch at 1700 r.p.m.

When the output speed increases to a level somewhat above 1700 r.p.m., the flyweight force shifts the plunger 38 far enough against the action of the spring 58 to bring the second spring 102 into engagement with its stop sleeve 104 and thus adds the force of this spring to that of the first spring. By proper adjustment of the position of the stop sleeves, the two springs may be set to hold the plunger against opening of the overspeed port 70 by the land 66 until the output speed attains the selected upper limit of the lock-up range, for example, 2500 r.p.m. At this speed, the flyweights 49 move the plunger to the right against the combined force of the two springs far enough to uncover the overspeed port thereby admitting pressure fluid from the passage 77 (maintained at 40 p.s.i. by the pressure-reducing valve 78) into the sleeve 42 between the plunger and the pilot piston 87. The pressure build-up in the bore overrides the speed sensor 40 and shifts the plunger on to the right until the stem 97 engages the stop bar 112. During this movement of the plunger, the supply port 69 is closed by the land 66 and the drain port 67 is opened to the clutch port 68 as shown in FIG. 8. Accordingly, the clutch chamber 33 again is vented and the clutch 11 is disengaged to activate the converter 14 for the effective braking action produced when the transmission shaft 28 is driven by the wheels and the output shaft 25 thus drives the engine 15 through the converter.

As the speed of the output shaft drops, the flyweight force also drops and permits the speeder springs 58 and 102 to return the plunger 38 to the left and close the overspeed port 70. With the pressurized fluid in the sleeve cooperating with the flyweight force in urging the plunger to the right, the plunger is moved back to the left far enough to close the overspeed port and open the supply port 69 to the clutch port 68 only after the output speed has reached a substantially lower level than 2500 r.p.m., for example, 2200 r.p.m. The difference between these two levels is determined by the total force added to the plunger by the pressure fluid in the sleeve at the left end of the plunger. Again, this resetting of the control eliminates hunting under transient operating conditions.

Following cracking open of the supply port 69 at 2200 r.p.m., pressure fluid flows to the clutch passage 75 at a rate that increases progressively with movement of the plunger 38 to the left. The rate of plunger movement, and thus the rate of opening of the supply port to the clutch port, is controlled by the rate of leakage of trapped fluid from the left side of the plunger through the clearance around the rod 94 in the plunger bore 85 to an orifice 84 (FIG. 2) in the opposite end portion of the plunger. The orifice and the clearance, which are represented schematically in FIGS. 3–9, produce a smooth and steady return of the plunger to the left to a position corresponding to the prevailing output speed. Thus, the clutch 11 will be engaged to lock up the converter and maintain the locked-up condition so long as the output speed remains between 1400 and 2500 r.p.m.

When the machine operator initiates a transmission shift by rocking the lever 19 about its pivot 109 from one of its positons in FIG. 1 to another position, the valve 83 is opened to deliver a charge of pressure fluid through shift line 63a to the passage 82 and thus to the shift port 71. It will be seen in the drawings that this port is spaced to the left from the land 66 in all positions of the plunger except the start position shown in FIG. 3. To operate the shift valve, the lever 19 carries a cam having a series of angularly spaced rises 110 engageable with the actuator pin of the valve as the lever moves from one position to another, each rise depressing the pin to open the valve momentarily as the lever changes positions. Thus, at the beginning of each transmission ratio change, the plunger is forced rapidly to the right to the fully extended position, just as shown in FIG. 8 for the 2500 r.p.m. condition. This, of course, immediately vents the clutch line 75 through the drain line 73 to unlock the converter 14 during the ratio change. The shift valve 83 closes to trap pressure fluid in the sleeve 42 on the left side of the land 66 so that the leak rate through the bore 85 also controls the rate of return of the plunger to the left by the speeder springs 58 and 102. If the prevailing output speed is below 2200 r.p.m., the plunger moves back through the position shown in FIG. 9 to open the supply port 69 to the clutch port 68 and reengage the clutch 11, after a momentary time delay controlled by the leak rate through the bore 85. If the output speed should be below 1400 r.p.m., the plunger moves on to the left through the position shown in FIG. 6 and thus disengages the clutch to restore converter operation.

From the foregoing, it will be seen that the speed-responsive actuator 10 including the speed sensor 40 effectively controls the engagement and disengagement of the clutch 11 for locking and unlocking the torque converter 14 in response to different sensed output speed conditions, and also preparatory to a transmission shift. It should be apparent to those skilled in the art that the representative speed levels given herein for actuation of the clutch may be varied according to the circumstances of a particular installation simply by selecting springs 58, 79, 93 and 102 having different strengths, and by using different source pressure in the hydraulic system. The adjusting screws 80, 95, 101 and 105 make it possible to vary each level to some extent with a selected set of springs.

I claim as my invention:

1. For controlling the transmission of rotary power through a torque converter having relatively rotatable input and output elements and a clutch operable when engaged to lock up said converter and, when disengaged, to unlock said converter, a speed-responsive clutch actuator having, in combination, a housing, a control member movable back and forth in said housing along a predetermined path from a start position through first and second control positions spaced apart in one direction along said path from said start position, first clutch-actuating means in said housing and on said control member for maintaining the clutch disengaged while said member is between said start position and said first position, second clutch-actuating means in said housing and on said member for maintaining the clutch engaged while said member is between said first position and said second position, and third means in said housing and on said member for maintaining said clutch disengaged while said member is beyond said second position, means for measuring the speed of said output element and urging said members in said one direction with a force that varies directly with the measured speed, and means cooperating with said measuring means to move said member in said one direction from said start position through said first position as said speed increases from zero through a first preselected level, and on from said first position through said second position as said speed increases further from said first level through a second substantially higher level.

2. A speed-responsive actuator as defined in claim 1 in which said member is a valve spool guided in a bore in said housing, and said clutch-actuating means comprise lands on said spool and a series of ports spaced along said bore, said ports including a clutch port, a drain port communicating with said clutch port when said spool is between said start position and said first position and beyond said second position, and a supply port communicating with said clutch port while said spool is between said first and second positions.

3. The combination defined in claim 2 further including a multi-ratio transmission driven by said output element and having a selector for changing the transmisison ratio and shift means responsive to the initiation of a change in the transmisison ratio by said selector to move said spool independently of said speed sensor beyond said second position for immediate disengagement of said clutch.

4. The combination defined in claim 3 in which said shift means comprise a valve actuated by said selector and operable to deliver a charge of pressure fluid to said bore at one end of said spool to move the spool in said one direction.

5. A speed-responsive actuator as defined in claim 2 further including means activated as said spool begins to open said supply port to said clutch port and operable to apply an additional force to said spool in said one direction for rapid actuation of said clutch.

6. A speed-responsive actuator as defined in claim 5 in which said port-opening means includes a pilot piston guided in said bore adjacent the trailing end of said spool for movement in said one direction to an extended position, a conduit for transmitting pressure fluid from said clutch port to said bore on the side of said piston remote from said spool, and means on said piston for engaging the spool as the latter moves toward said extended position.

7. A speed-responsive actuator as defined in claim 6 in which said spool-engaging means is a spring pressing against said spool when said piston is in said extended position, and further including means for selectively adjusting the force exerted by said spring.

8. A speed-responsive actuator as defined by claim 2 further including means activated as said spool moves in said one direction through said first position and operable when activated to add a preselected force to said spool in said one direction whereby the spool is moved back through said first position to disengage said clutch only upon a reduction of said speed to a third level substantially below said first level.

9. A speed-responsive actuator as defined by claim 8 further including means activated as said spool moves in said one direction through said second position and operable when activated to add a preselected force to said spool in said one direction whereby the spool is moved back through said second position only upon a reduction of said speed to a fourth level substantially below said second level.

10. A speed-responsive actuator as defined in claim 9 in which said force-adding means includes an overspeed port for communicating with a source of pressure fluid and positioned along said bore to be exposed at the trailing end of said spool as the latter moves through said second position.

11. A speed-responsive actuator as defined in claim 1 having means resetting said speed sensor to move said member back through said second position as said speed decreases from said second level through a third level between said first and second levels, and also resetting said speed sensor to move said member back through said first position as said speed decreases from above said first level through a lower fourth level.

12. A speed-responsive actuator as defined in claim 1 in which said cooperating means include a first spring opposing movement of said member in said one direction through the entire stroke, and a second spring opposing said member only after the latter has passed through said first control position.

13. The combination defined in claim 12 further including means for selectively adjusting the forces exerted by said springs on said member thereby to vary the position of the member under a given speed condition.

14. For controlling the transmission of rotary power through a torque converter having relatively rotatable input and output elements and a device operable selectively to lock up and unlock said converter, a speed-responsive actuator having, in combination, a speed sensor for measuring the speed of said output element, a single control member movable back and forth along a predetermined path by said speed sensor, in one direction during acceleration of said output element and in the other direction during deceleration of said element, and valve means associated with said control member and automatically actuating said device during operation of said converter to maintain the converter unlocked at speeds below a first preselected level, to lock up said converter as said speed increases through a preselected higher second level from below said first level, to thereafter maintain said converter locked up while the speed remains between said first level and a preselected third level higher than said second level, to unlock said converter as the speed increases beyond said third level, and to lock up the converter as the speed decreases from above said third level to a preselected fourth level between said second and third levels.

15. The combination defined in claim 14 further including a multi-ratio transmission driven by said output element and having a selector for changing the transmission ratio, and means responsive to the initiation of a change in the transmission ratio by said selector to override said speed sensor when said converter is locked up and immediately move said control member in a direction to actuate said device to unlock the converter.

16. The combination defined in claim 15 in which said last-mentioned means include a valve opened momentarily by said selector at the initiation of the change and delivering a charge of pressure fluid to said actuator.

17. In combination with a prime mover, a torque converter having relatively rotatable input and output elements, a clutch operable when engaged to lock up said converter for a positive drive, and a multi-ratio transmission driven by said output element and having a selector for changing the transmission ratio, the improvement comprising, a speed sensor for measuring the speed of said output element, means controlled by said speed sensor and automatically actuating said clutch to maintain said clutch disengaged while said speed is below a first preselected level, to engage the clutch as the speed increases through said preselected level, and to maintain the clutch engaged while the speed is within a preselected range, said clutch-actuating means including a control member movable along a predetermined path in one direction from a start position through first and second spaced control positions, means associated with said member for engaging said clutch as said member moves in said one direction through said first position and disengaging said clutch as said member moves in said one direction through said second position, and means responsive to the initiation of a change in said transmission ratio by said selector when said clutch is engaged and operable to override said clutch-actuating means and disengage the clutch.

18. The combination defined in claim 17 in which said speed sensor includes means for moving said member through said first position as the speed increases through a first preselected level, and moving said member through said second position as the speed increases further through a second substantially higher level.

19. The combination defined in claim 18 including means cooperating with said speed sensor to move said member back through each of said positions at speeds substantially lower than said first and second levels, respectively.

20. The combination defined in claim 18 in which said overriding means operate on said control member to shift the latter through said second position in response to initiation of a transmission change.

21. The combination defined in claim 20 in which said member is a valve spool guided in a bore, and said overriding means admit pressure fluid to said bore on one side of said spool to shift the latter on said one direction along the bore.

22. The combination defined in claim 21 further including means for restricting the escape of said pressure fluid from said bore thereby to regulate the rate of return movement of said spool.

23. The combination defined in claim 21 in which said speed sensor comprises a rotary flyweight device coupled to said output element and urging said spool in said one direction with a force that increases with the speed of rotation of the output element, and spring means opposing said flyweight device and balancing against the latter in different positions of said spool according to the measured speed.

References Cited

UNITED STATES PATENTS

| | | | |
|---|---|---|---|
| 3,058,373 | 10/1962 | Snoy et al. | 192—3.3 XR |
| 3,068,974 | 12/1962 | Jandasek | 192—3.31 XR |
| 3,126,988 | 3/1964 | Memmer. | |
| 3,240,308 | 3/1966 | Frost | 192—3.3 XR |
| 3,262,523 | 7/1966 | Gordon | 192—3.29 |

BENJAMIN W. WYCHE, III, *Primary Examiner.*